(12) United States Patent
Tamura et al.

(10) Patent No.: US 6,746,801 B2
(45) Date of Patent: Jun. 8, 2004

(54) ELECTRODE FOR LITHIUM SECONDARY BATTERY AND LITHIUM SECONDARY BATTERY

(75) Inventors: Noriyuki Tamura, Katano (JP); Daizo Jito, Hirakata (JP); Ryuji Ohshita, Neyagawa (JP); Masahisa Fujimoto, Osaka (JP); Maruo Kamino, Katano (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 154 days.

(21) Appl. No.: 09/987,167

(22) Filed: Nov. 13, 2001

(65) Prior Publication Data

US 2002/0086215 A1 Jul. 4, 2002

(30) Foreign Application Priority Data

Nov. 14, 2000 (JP) .................................. 2000-346984

(51) Int. Cl.[7] .................................................. H01M 4/66
(52) U.S. Cl. .................. 429/245; 429/231.95; 429/233; 429/245
(58) Field of Search ........................... 429/245, 231.95, 429/233

(56) References Cited

U.S. PATENT DOCUMENTS

6,432,585 B1 * 8/2002 Kawakami et al. .......... 429/233

FOREIGN PATENT DOCUMENTS

| JP | 8-50922 A | 2/1996 |
| JP | 11-233116 A | 8/1999 |
| JP | 11-242954 A | 9/1999 |
| JP | 2000-200610 A | 7/2000 |

OTHER PUBLICATIONS

Winter, M. et al.; "Electrochemical Lithiation of Tin and Tin–based Intermetallics and Composites"; *Electrochimica Acta*; vol 45, pp. 31–50; 1999.

* cited by examiner

Primary Examiner—Patrick Ryan
Assistant Examiner—Angela J. Martin
(74) Attorney, Agent, or Firm—Kubovcik & Kubovcik

(57) ABSTRACT

An electrode for a lithium secondary battery in which an alloy thin film containing Sn (tin) and In (indium) is formed on the surface of a current collector having a surface roughness Ra of 0.1 μm or more, and a lithium secondary battery using thereof.

9 Claims, 1 Drawing Sheet

ELECTRODE FOR LITHIUM SECONDARY BATTERY AND LITHIUM SECONDARY BATTERY

BACKGROUND OF THE INVENTION

1. Field of the Invention

The present invention relates to a novel electrode for a lithium secondary battery and a lithium secondary battery using thereof.

2. Related Art

Lithium secondary batteries which are vigorously studied and developed in recent years have battery characteristics such as charge/discharge voltages, charge/discharge cycle life characteristics, and storage characteristics which are considerably dependent on electrodes used in the lithium secondary batteries. For this reason, the improvements in the electrodes active materials are attempted to enhance battery characteristics.

When a lithium metal is used as a negative-electrode active material, batteries having high energy densities per weight and per volume can be constituted. However, lithium is precipitated in the form of a dendrite in a charging state to disadvantageously cause an internal short circuit.

On the other hand, lithium secondary batteries which use, as an electrode material, aluminum, silicon, tin, or the like electrochemically making an alloy with lithium in a charging state are reported (Solid State Ionics, 113–115, p57 (1998)).

However, when these metals which are alloyed with lithium (Li) are used as negative electrode materials, the materials considerably increase or reduce in volume with absorption and release of lithium, the electrode active materials are pulverized to be eliminated from a current collector, so that sufficient cycle characteristics cannot be obtained disadvantageously.

SUMMARY OF THE INVENTION

It is an object of the present invention to solve these conventional problems and to provide an electrode for a lithium secondary battery which has a large discharge capacity and excellent cycle characteristics and a lithium secondary battery using thereof.

The electrode for a lithium secondary battery according to the present invention is characterized in that an alloy thin film containing Sn (tin) and In (indium) is formed on the surface of a current collector having a surface roughness Ra of 0.1 $\mu$m or more.

In the present invention, the surface roughness Ra of the current collector is 0.1 $\mu$m or more. When the surface roughness Ra is set in such a range, preferable charge/discharge cycle characteristics can be obtained. Although the maximum value of the surface roughness Ra is not limited to a specific value, a current collector having a surface roughness Ra which exceeds 2 $\mu$m cannot be easily obtained as a foil having a practical thickness. Therefore, as the preferable range of the surface roughness Ra, the range of 0.1 to 2 $\mu$m is employed.

In the present invention, the surface roughness Ra and an average interval S between local tops of the current collector preferably satisfy a relationship given by: $100\text{Ra} \geq \text{S}$. When the relationship is satisfied, the charge/discharge cycle characteristics can be further improved.

The surface roughness Ra and the average interval S between local tops are determined by the Japanese Industrial Standards (JIS B 0601-1994), and can be measured by, e.g., a surface measuring instrument or a laser microscope.

In the present invention, an alloy thin film containing Sn and In is formed on the current collector. Since lithium (Li) can be absorbed by alloying in this alloy thin film, the alloy thin film functions as an active material. The Sn content in the alloy thin film preferably falls within the range of 10 to 90% by weight, and, more preferably, the range of 25 to 85% by weight. When the alloy thin film consists of Sn and In, the Sn content preferably falls within the range of 10 to 90% by weight, and the In content preferably falls within the range of 90 to 10% by weight. More preferably, the Sn content preferably falls within the range of 25 to 85% by weight, and the In content preferably falls within 75 to 15% by weight.

In the alloy thin film, Sn and In preferably constitute an intermetallic compound. When the Sn content falls within the range of 10 to 25% by weight or the range of 85 to 90% by weight, the phase of the intermetallic compound and the phase of a single metal are formed. When the Sn content falls within the range of 25 to 85% by weight, only the phase of the intermetallic compound (i.e., β-phase, γ-phase, or a mixed phase of β-phase and γ-phase) is formed.

In the present invention, the alloy thin film containing Sn and In can be used as an active material. Such an alloy thin film is used as the active material to make it possible to achieve charge/discharge cycle characteristics which are better than those obtained when a metal thin film consisting of only, e.g., Sn is used as an active material. It is supposed that the use of the alloy thin film containing In can moderate stress generated in the active material thin film when expansion and shrinkage of the active material thin film occurring with charging/discharging.

According to the present invention, although the method of forming an alloy thin film is not limited to a specific method, an electrolytic plating method, an electroless plating method, a sputtering method, a deposition method, and the like can be used.

As a material of the current collector used in the present invention, a material which is not alloyed with lithium (Li) is preferably used, and a material alloyed with Sn and In serving as active materials is preferably used. As such a material, for example, copper is used. Therefore, in the present invention, a copper foil is preferably used as the current collector. In addition, as the copper foil, an electrolytic copper foil which is known as a copper foil having a large surface roughness Ra is preferably used.

In the present invention, a mixed layer constituted by a current collector component and an alloy thin film component may be formed in the interface between the current collector and the alloy thin film. Such a mixed layer can be formed by performing heat treatment after the alloy thin film is formed. As the temperature of the heat treatment, a temperature (°C.) which is about 80% to 90% of the melting point (°C.) of the alloy thin film is mentioned.

A lithium secondary battery according to the present invention is characterized by comprising a negative electrode constituted by an electrode for the lithium secondary battery according to the present invention, a positive electrode, and a nonaqueous electrolyte.

An electrolyte used in the lithium secondary battery is not limited to a specific solvent. However, a mixed solvent obtained by combining a cyclic carbonate such as ethylene carbonate, propylene carbonate, or butylene carbonate and a chain carbonate such as dimethyl carbonate, methyl ethyl carbonate, or diethyl carbonate is illustrated. A mixed solvent obtained by combining the cyclic carbonate and an ether solvent such as 1,2-dimethoxy ethane or 1,2-diethoxyethane is also illustrated. As an electrolytic solute, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, or $LiC(C_2F_5SO_2)_3$ or a mixed thereof is illustrated. In addition, a gel polymer electrolyte obtained by impregnating an electrolyte in a polymer electrolyte such as polyethylene oxide, polyacrylonitrile, or polyvinylidene fluoride and an inorganic solid-state electrolyte such as LiI or $Li_3N$ are illustrated. The electrolyte of the lithium secondary battery according to the present invention can be used without any restriction if an Li compound serving as a solute which exhibits ion conductivity and a solvent which dissolves and holds the Li compound are not decomposed at a voltage in a charge state, a discharge state, or a holding state of the battery.

As a positive active material of the lithium secondary battery according to the present invention, a lithium-contained transition metal oxide such as $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$ or a metal oxide such as $MnO_2$ which does not contain lithium is illustrated. In addition, any material in which lithium is electrochemically inserted or from which lithium is electrochemically removed can be used without any restriction.

DETAILED DESCRIPTION OF PREFERRED EMBODIMENT

Figure 1:
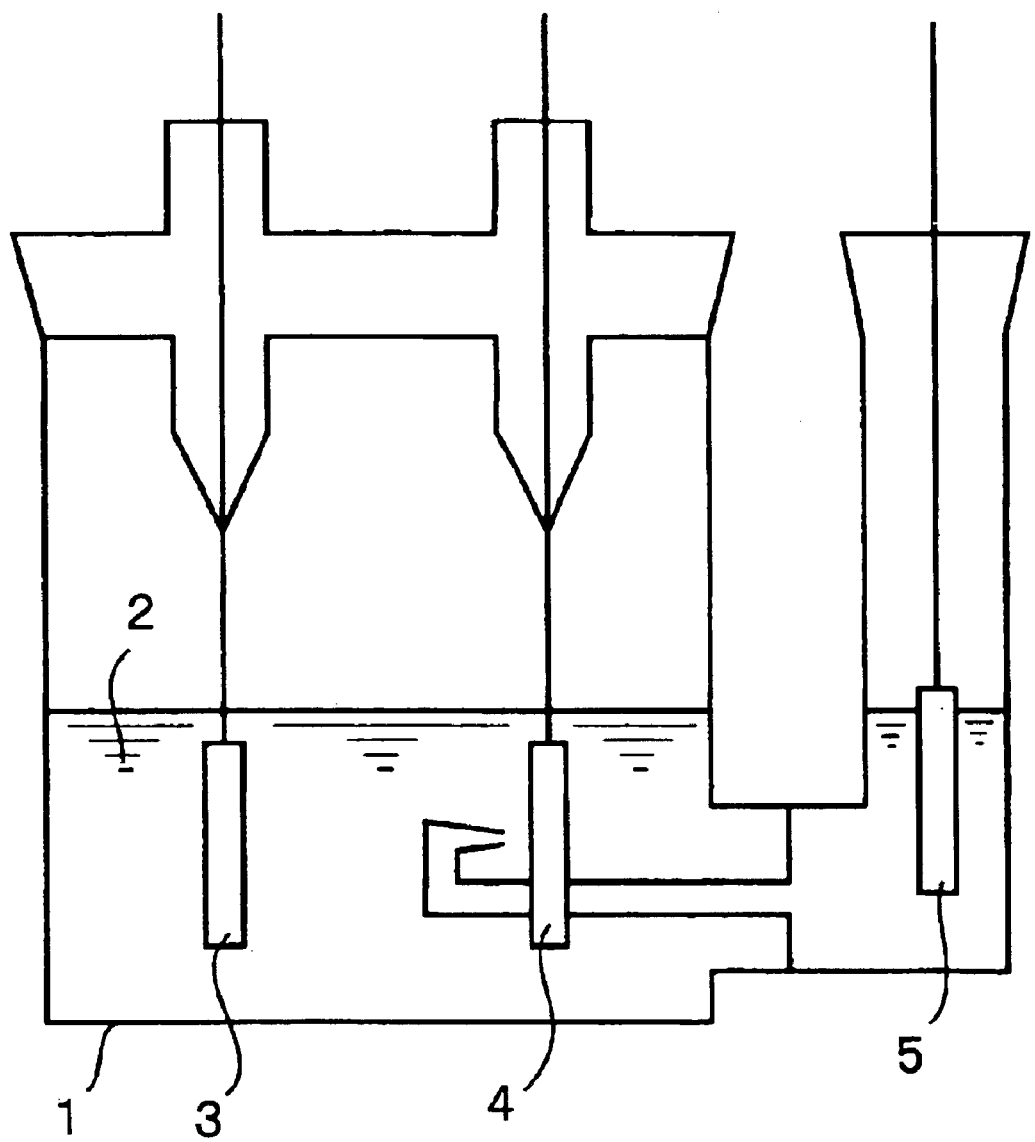
FIG. 1 is a typical sectional view showing a beaker cell fabricated in an embodiment.

The present invention will be described below with reference to an embodiment. However, the present invention is not limited to the following embodiment, and various modifications of the present invention can be effected without departing from the spirit and scope of the invention.
[Fabrication of Electrode]

Four types of copper foils were used as current collectors, and alloy thin films each consisting of Sn and In and each having a thickness of 2 μm were formed on surfaces having predetermined surface roughness Ra (to be described below) by an electrolytic plating method. As the copper foils, an electrolytic copper foil A (surface roughness Ra=0.19 μm and an average interval S between local tops=1.8 μm), an electrolytic copper foil B (surface roughness Ra=0.60 μm and an average interval S between local tops=2.2 μm), an electrolytic copper foil C (surface roughness Ra=1.19 μm and an average interval S between local tops=1.9 μm), and a rolled copper foil (surface roughness Ra=0.04 μm and an average interval S between local tops=3.4 μm) were used.

The surface roughness Ra were measured by a confocal scanning laser microscope (OLS1100 manufactured by Olympus Optical Co., Ltd.) under conditions: magnification of objective lens=100; measurement range=128×96 μm; laser beam source=Ar laser (488 nm), and cutoff=⅛.

In electrolytic plating, a mixed solution of indium sulfate, sodium stannate, and potassium sodium tartrate was used. The formed alloy thin film has a composition of 50% by weight of Sn and 50% by weight of In to form an intermetallic compound.

An electrode using the electrolytic copper foil A was defined as an electrode a1, an electrode using the electrolytic copper foil B was defined as an electrode a2, an electrode using the electrolytic copper foil C was defined as an electrode a3, and an electrode using the rolled copper foil was defined as a comparative electrode b1.

An alloy powder (mole ratio is 9:1) fabricated by an atomization method was mixed with a vinylidene fluoride resin (PVdF) in the ratio by weight of 5:5 to prepare a slurry, and the slurry was coated on the electrolytic copper foil C to fabricate a comparative electrode. This electrode is defined as a comparative electrode b2.
[Preparation of Electrolyte]

$LiPF_6$ of 1 mol/liter was dissolved in mixed solvent obtained by mixing ethylene carbonate and diethyl carbonate in the ratio by volume of 1:1 to prepare an electrolyte.
[Fabrication of Beaker Cell]

The electrodes described above were used to fabricate a beaker cell as shown in FIG. 1. As shown in FIG. 1, the beaker cell is constituted such that a counter electrode 3, a working electrode 4, and a reference electrode 5 are dipped in an electrolyte in a vessel 1. As an electrolyte 2, the above electrolyte was used, and lithium metals are used as the counter electrode 3 and the reference electrode 5.
[Cycle Characteristics]

The beaker cell fabricated as described above was used to evaluate the cycle characteristics of the respective electrodes. Charging was performed in three steps in which a current value was sequentially changed to 1 mA, 0.5 mA, and 0.2 mA up to 0 V (vs. $Li/Li^+$). Discharging was performed in three steps in which a current value was sequentially changed to 1 mA, 0.5 mA, and 0.2 mA up to 2 V (vs. $Li/Li^+$). This charge/discharge operation was determined as one cycle. Ten charge/discharge cycles were performed, and capacity retentions were calculated by the following equation. The results are shown in Table 1. The measurement was performed at 25° C. Reduction of the working electrode was determined as a charge operation, and oxidation of the working electrode was determined as a discharge operation.

Capacity retention (%)=(discharge capacity of 10th cycle/discharge capacity of first cycle)×100

TABLE 1

| Electrode | Current Collector Surface Roughness Ra (μm) | Capacity Retention (%) |
|---|---|---|
| a1 | 0.19 | 94 |
| a2 | 0.60 | 96 |
| a3 | 1.19 | 96 |
| b1 | 0.04 | 72 |
| b2 | 1.19 (Sn/In alloy powder) | 1 |

As shown in Table 1, in the electrodes a1 to a3 according to the present invention in which copper foils each having a surface roughness Ra of 0.1 μm or more are used as current collectors, excellent charge/discharge cycle characteristics can be obtained.

In the above embodiment, an alloy thin film is formed on a copper foil by an electrolytic plating method. However, the present invention is not limited to the embodiment. The alloy thin film may be formed by an electroless plating method or a film forming method such as a sputtering method or a vacuum deposition method.

According to the present invention, a lithium secondary battery having a large discharge capacity and excellent cycle characteristics can be achieved.

What is claimed is:

1. An electrode for a lithium secondary battery wherein an alloy thin film containing Sn (tin) and In (indium) is formed on the surface of a current collector having a surface roughness Ra of not less than 0.1 μm.

2. The electrode for a lithium secondary battery according to claim 1, wherein the Sn content in said alloy thin film falls within the range of 10 to 90% by weight.

3. The electrode for a lithium secondary battery according to claim 1, wherein the method of forming said alloy thin film is an electrolytic plating method, an electroless plating method, a sputtering method, or a deposition method.

4. The electrode for a lithium secondary battery according to claim 1, wherein said current collector is a copper foil.

5. The electrode for a lithium secondary battery according to claim 4, wherein said copper foil is an electrolytic copper foil.

6. The electrode for a lithium secondary battery according to claim 1, wherein a mixed layer constituted by a current collector component and an alloy thin film component is formed in the interface between said current collector and said alloy thin film.

7. The electrode for a lithium secondary battery according to claim 6, wherein said mixed layer is formed by heat treatment after the alloy thin film is formed.

8. The electrode for a lithium secondary battery according to claim 1, wherein the surface roughness Ra and an average interval S between local tops of said current collector satisfy a relationship given by: $100Ra \geq S$.

9. A lithium secondary battery comprising a negative electrode constituted by the electrode according to claim 1, a positive electrode, and a nonaqueous electrolyte.

* * * * *